United States Patent
Wang et al.

(10) Patent No.: US 10,486,992 B2
(45) Date of Patent: Nov. 26, 2019

(54) USE OF ACTIVATED CARBON IN A MEMBRANE BIOREACTOR

(71) Applicants: Sijing Wang, Shanghai (CN); Nicholas William H. Adams, Oakville (CA); Jeffrey Gerard Peeters, Oakville (CA); Wajahat Hussain Syed, Burlington (CA); Lei Wang, Shanghai (CN); Ying Zhou, Shanghai (CN)

(72) Inventors: Sijing Wang, Shanghai (CN); Nicholas William H. Adams, Oakville (CA); Jeffrey Gerard Peeters, Oakville (CA); Wajahat Hussain Syed, Burlington (CA); Lei Wang, Shanghai (CN); Ying Zhou, Shanghai (CN)

(73) Assignee: BL TECHNOLOGIES, INC., Minnetonka, MN (US)

( * ) Notice: Subject to any disclaimer, the term of this patent is extended or adjusted under 35 U.S.C. 154(b) by 126 days.

(21) Appl. No.: 14/649,922

(22) PCT Filed: Dec. 7, 2012

(86) PCT No.: PCT/CN2012/086148
§ 371 (c)(1),
(2) Date: Jun. 5, 2015

(87) PCT Pub. No.: WO2014/086033
PCT Pub. Date: Jun. 12, 2014

(65) Prior Publication Data
US 2015/0329394 A1    Nov. 19, 2015

(51) Int. Cl.
*C02F 3/12*  (2006.01)
*C02F 3/30*  (2006.01)
*C02F 103/36* (2006.01)

(52) U.S. Cl.
CPC .......... *C02F 3/1226* (2013.01); *C02F 3/1273* (2013.01); *C02F 3/30* (2013.01);
(Continued)

(58) Field of Classification Search
None
See application file for complete search history.

(56) References Cited

U.S. PATENT DOCUMENTS 5,472,607 A  * 12/1995  Mailvaganam ........ B01D 69/08
                                                      210/490
5,585,004 A  * 12/1996  Livingston ............... C02F 3/06
                                                      210/321.87
(Continued)

FOREIGN PATENT DOCUMENTS

CA     1159756 A     1/1984
CN   102167469 A     8/2011
(Continued)

OTHER PUBLICATIONS

Remy et al. "Low dose powdered activated carbon addition at high sludge retention times to reduce fouling in membrane bioreactors". Water Research 43, 345-350, p. 43 (Year: 2009).*
(Continued)

*Primary Examiner* — Ryan B Huang

(57) ABSTRACT

A membrane bioreactor (MBR) has membranes comprising a supporting structure. A supply unit doses a sorbent such as powdered activated carbon (PAC) into the MBR. The PAC is maintained at a concentration in the mixed liquor of 200 mg/L or more. Mixed liquor with the sorbent particles recirculates within the MBR at a flow rate of at least twice the feed flow rate. Air bubbles are provided to scour the membranes including during at least part of a permeation step. The sorbent particles are present in the mixed liquor and contact the membranes. Bioaugmentation products may
(Continued)

be immobilized on PAC or other carriers and then added to an MBR or other bioreactors.

15 Claims, 4 Drawing Sheets

(52) U.S. Cl.
CPC .. *C02F 2103/365* (2013.01); *C02F 2209/001* (2013.01); *C02F 2209/08* (2013.01); *C02F 2209/22* (2013.01); *C02F 2303/16* (2013.01); *C02F 2303/20* (2013.01); *C02F 2303/24* (2013.01); *C02F 2305/06* (2013.01); *Y02W 10/15* (2015.05)

(56) References Cited

U.S. PATENT DOCUMENTS

| | | | |
|---|---|---|---|
| 5,932,099 A * | 8/1999 | Cote | B01D 61/18 210/151 |
| 6,354,444 B1 | 3/2002 | Mailvaganam | |
| 7,267,872 B2 | 9/2007 | Lee | |
| 7,306,105 B2 | 12/2007 | Shinada | |
| 8,052,873 B1 | 11/2011 | Foster et al. | |
| 2007/0209999 A1 | 9/2007 | Smith | |
| 2008/0164214 A1 | 7/2008 | Lerner et al. | |
| 2008/0292823 A1 | 11/2008 | Lee et al. | |
| 2009/0236282 A1 | 9/2009 | Wang | |
| 2010/0024631 A1 * | 2/2010 | Lee | B01D 69/087 87/9 |
| 2010/0072130 A1 | 3/2010 | Fane et al. | |
| 2010/0264082 A1 * | 10/2010 | Conner | C02F 3/1273 210/620 |
| 2011/0132836 A1 * | 6/2011 | Olson | C02F 3/006 210/605 |
| 2012/0255903 A1 | 10/2012 | Kloos | |
| 2012/0273409 A1 * | 11/2012 | Seo | B01D 69/08 210/500.23 |

FOREIGN PATENT DOCUMENTS

| | | |
|---|---|---|
| CN | 102633401 A | 8/2012 |
| CN | 102639448 A | 8/2012 |
| FR | 2924111 A1 | 5/2009 |
| JP | 61230795 A * | 10/1986 |
| JP | H07-328624 | 12/1995 |
| JP | 2012112565 A | 6/2012 |
| RU | 2317843 C2 | 2/2008 |
| WO | 2006137808 A1 | 12/2006 |
| WO | 2007056818 A1 | 5/2007 |
| WO | 20090085252 A1 | 7/2009 |
| WO | 2010062454 | 6/2010 |
| WO | 2011111879 A1 | 9/2011 |

OTHER PUBLICATIONS

Remy et al., "Low dose powdered activated carbon addition at high sludge retention times to reduce fouling in membrane bioreactors", Water Research, Elsevier, Amsterdam, NL, vol. No. 43, Issue No. 02, ISSN: 0043-1354, pp. 345-350, Feb. 1, 2009.
European Search Report issued in connection with corresponding EP Application No. 12889644.6 dated Jul. 7, 2016.
Conner, "Oily Wastewater Reuse Technologies", Water shortages Existing technology, pp. 1-23, 2011.
Londono, "Assessment of Causes of Irreversible Fouling in Powdered Activated Carbon/ Ultrafiltration Membrane (PAC/UF) Systems" The University of British Columbia, pp. 1-68, Aug. 2011.
European Search Report issued in connection with corresponding EP Application No. 12889644.6 dated Jan. 4, 2017.
International Search Report and Written Opinion issued in connection with corresponding application PCT/CN2012/086148 dated Sep. 19, 2013.
Unofficial English translation of Russian Office Action and Search Report issued in connection with corresponding Application No. 2015120416 dated Aug. 12, 2016.
Chinese Patent Application No. 201280077524.X, Third Office Action Response dated Apr. 21, 2017—English Translation Available.
Canadian Patent Application No. 2,893,450, Office Action dated Jan. 11, 2018.
Chinese Patent Application No. 201280077524.X, Decision on Rejection dated Mar. 23, 2018.
Korean Patent Application No. 10-2015-7018216, Office Action dated Jan. 29, 2019.
European Patent Application No. 12889644.6, Notification Concerning the Date of Oral Proceedings dated Feb. 26, 2019.
European Patent Application No. 12889644.6, Summons to Attend Oral Proceedings dated Nov. 30, 2018.
European Patent Application No. 12889644.6, Office Action dated Feb. 16, 2018.
Brazil Patent Application No. 112015011576-4, Office Action dated Aug. 26, 2019.
Korean Patent Application No. 10-2015-7018216, Office Action dated Sep. 3, 2019.
Korea Water and Wastewater Works Association, Standards for sewage treatment works, 2011, pp. 525, 526, 530.

* cited by examiner

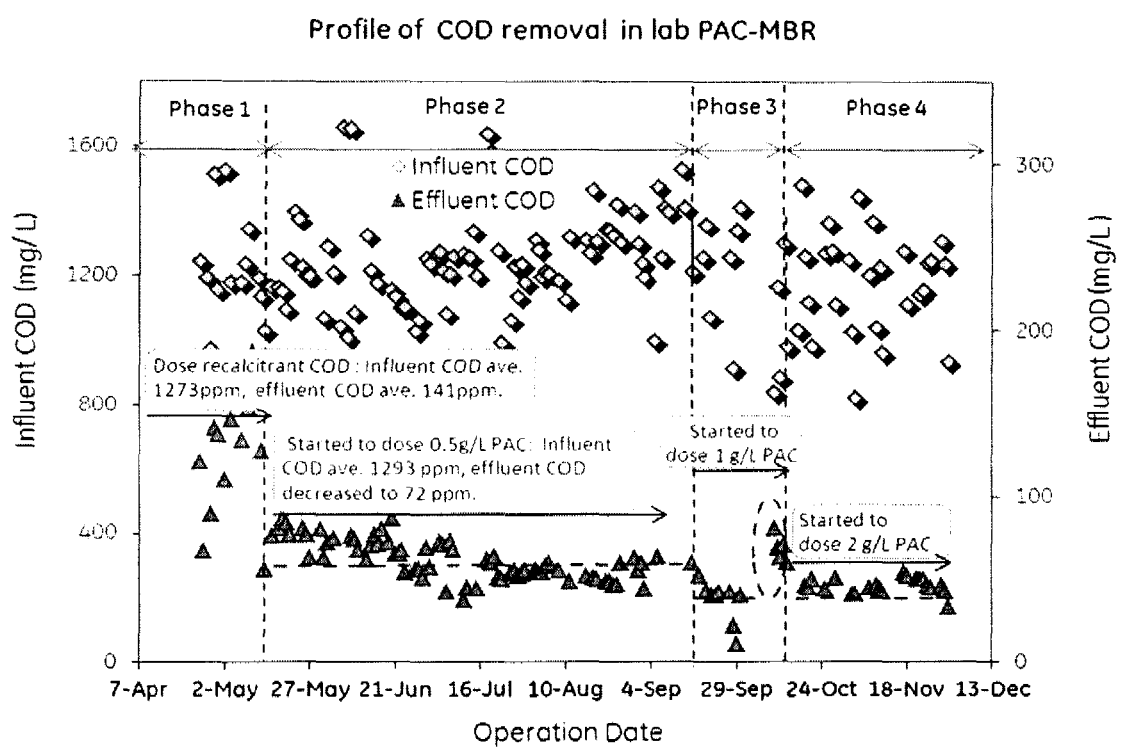
FIGURE 3 COD removal in lab PAC- MBR

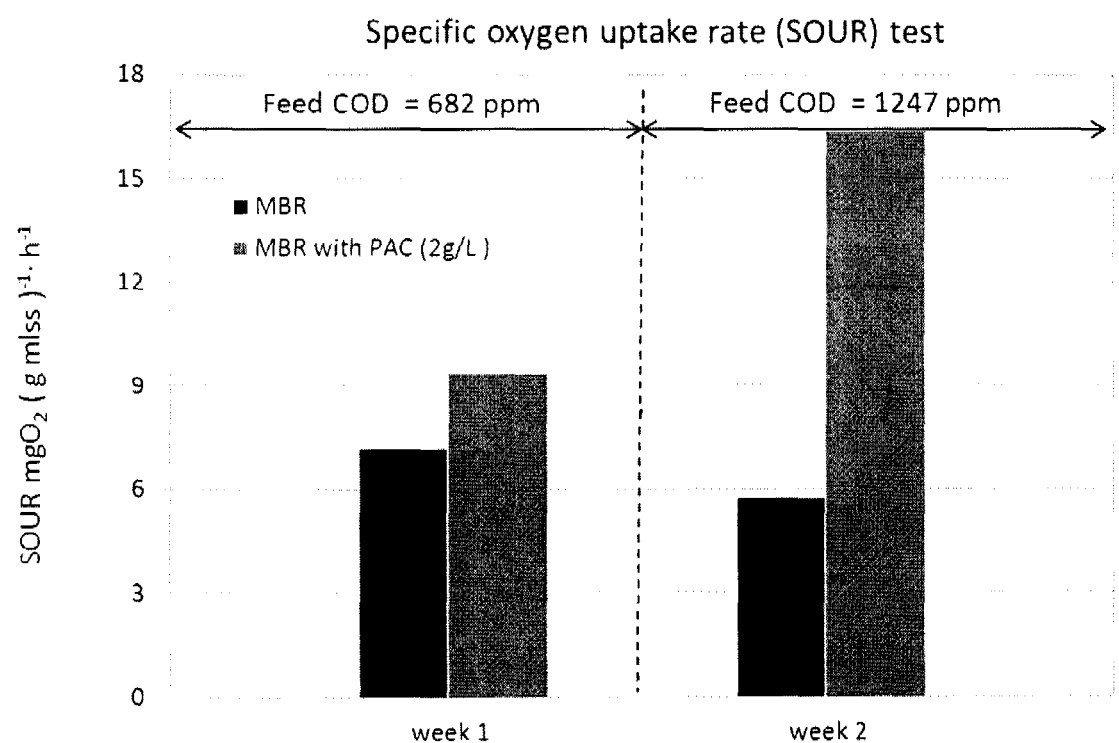
FIGURE 4 Comparison of SOUR for PAC – MBR & control MBR

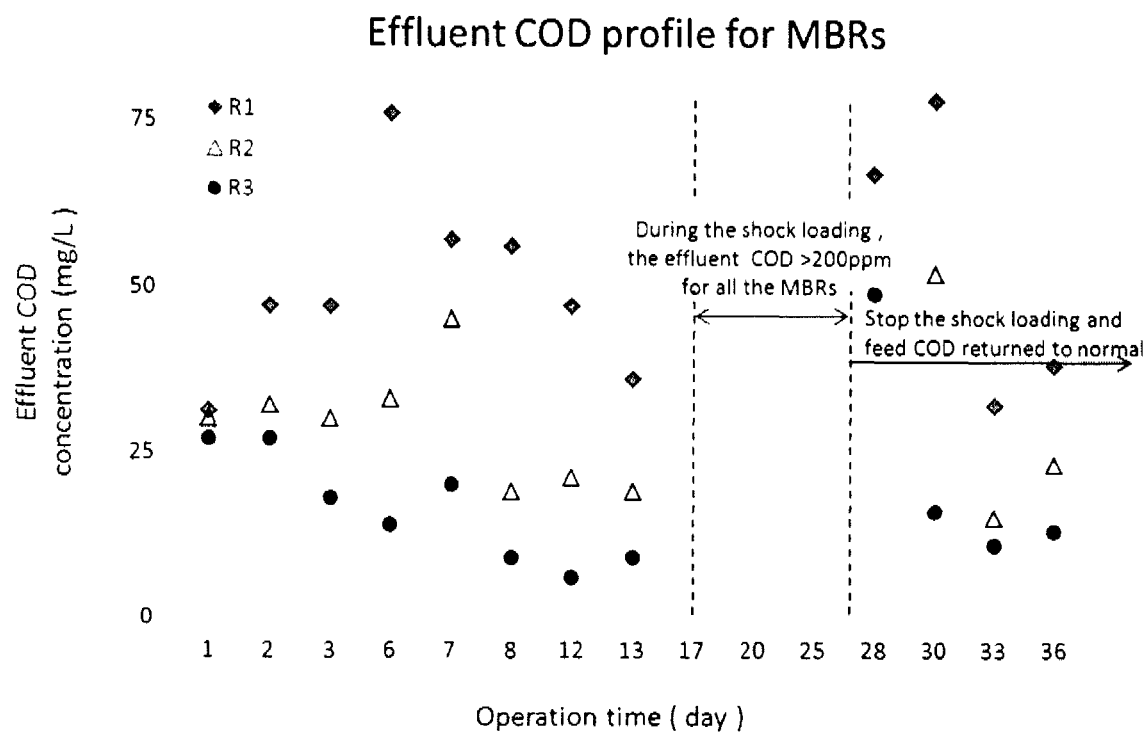
FIGURE 5 – Effluent COD for control (R1), PAC-MBR (R2) and bioaugmented PAC-MBR (R3)

USE OF ACTIVATED CARBON IN A MEMBRANE BIOREACTOR

FIELD

This specification relates to wastewater treatment and to membrane bioreactors.

BACKGROUND

The following discussion is not an admission that the information described below is common general knowledge among persons skilled in the art.

Powdered activated carbon (PAC) has been used in combination with immersed membranes for drinking water treatment. For example, at the Sioux Lookout Drinking Water Plant in Ontario, Canada, PAC and a coagulant are mixed with feed water. The feed water is stirred in a flocculation chamber to produce floc in the feed water. The feed water is then filtered through an immersed membrane. The PAC dosage rate in a water filtration system is about 25-50 mg/L.

Concerns with the use of PAC in membrane systems include irreversible fouling and abrasion damage to the membranes. The mechanism of irreversible fouling is not fully known. A thesis by Isabel Londono, Assessment of Causes of Irreversible Fouling in Powdered Activated Carbon/Ultrafiltration Membrane (PAC/UF) Systems (The University of British Columbia, 2011), suggests that fouling might be a result of the PAC causing other contaminants in the water to be adsorbed by the membranes. The abrasiveness of PAC is expressed by its Gold Number (GN). PAC selection guidelines for membrane water filtration recommend using PAC brands with a low GN, meaning that they are less abrasive.

A membrane bioreactor (MBR) also uses immersed membranes, but the operating conditions are different than for water filtration. For example, the solids content of mixed liquor in an MBR is much higher than in drinking water and there is no flocculation step. As a result, immersed membranes are air scoured more intensely in an MBR. The concentration of activated carbon that would be required is also much higher, for example 200 mg/L or more. Accordingly, the possibility of PAC fouling or abrading the membranes would be much higher in an MBR than for water filtration.

International Publication Number WO 2009/085252, Suspended Media Granular Activated Carbon Membrane Biological Reactor System and Process, reported that attempting to use powdered activated carbon in an MBR caused significant abrasion to the membranes and non-reversible fouling. A presentation by the inventor (William G. Conner, Oily Wastewater Reuse Technologies, 2011) reported that the abrasion caused up to a 40% reduction in the life expectancy of the membranes. Similarly, US Publication 201202555903 states that attempting to add PAC to an MBR would increase sludge concentration, pore plugging and membrane wear.

To avoid abrasion, WO 2009/085252 describes an MBR in which larger particles of granular activated carbon (GAC) are used. The GAC particles are of a size that can be screened from mixed liquor before the mixed liquor enters the membrane operating system. In this way, the particles are prevented from contact with the membranes.

A membrane bioreactor (MBR) is described in this specification. The MBR has membranes with a supporting structure. The membranes may be, for example, immersed suction driven hollow fiber membranes with a pore size of less than 0.1 microns. A supply unit doses particles of a sorbent, for example powdered activated carbon (PAC), into the MBR. The MBR is configured such that the particles are allowed to contact the membranes directly.

In a process described in this specification, a sorbent such as PAC is dosed into an MBR. The sorbent is maintained at a concentration in the mixed liquor of 200 mg/L or more. Mixed liquor recirculates through in the MBR at a flow rate of at least twice the feed flow rate (2Q). Permeate is withdrawn through immersed membranes comprising a supporting structure. The membranes are operated in a filtration cycle having steps of withdrawing permeate by suction and steps of backwashing or relaxation. Air bubbles are provided to scour the membranes including during at least part of the permeation step. Sorbent particles are present in the mixed liquor and contact the membranes.

In another process, a bioreactor is configured to be able to retain a carrier. One or more bioaugmentation products are added to the reactor. In an example, the one or more bioaugmentation products are screened for their ability to enhance removal of recalcitrant COD. In an example, the one or more bioaugmentation products are immobilized on the carrier before the carrier is added to the reactor. The carrier may be PAC and the reactor may be an MBR.

BRIEF DESCRIPTION OF THE FIGURES

FIG. 3 is a graph showing removal of chemical oxygen demand (COD) in laboratory testing of an MBR with powdered activated carbon (PAC).

FIG. 4 is a graph showing a comparison of specific oxygen uptake rate (SOUR) between an MBR with PAC and a control MBR.

FIG. 5 is a graph showing COD removal in a control MBR, an MBR with PAC, and an MBR with bioaugmented PAC.

DETAILED DESCRIPTION

Figure 1:
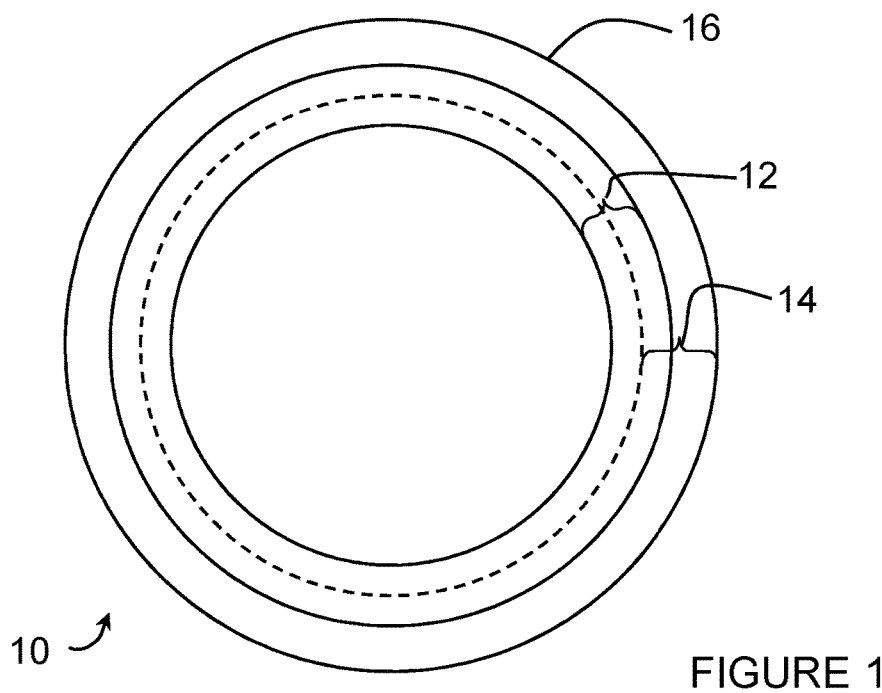
FIG. 1 is a cross section of hollow fiber membrane.

FIG. 1 shows a cross section of a hollow fiber membrane 10. The membrane 10 has a tubular support 12 and a membrane film 14 surrounding the support 12. The membrane film 14 may penetrate to some extent into the tubular support 12, but, in an embodiment, does not penetrate through more than half of the thickness of the support 12. The membrane film 14 has a skin 16 on its outer surface which defines the pore size of the film 14. The nominal or average pore size of the membrane 10 is, in an embodiment, less than 0.1 microns, or less than 0.05 microns, or 0.04 microns or less. The skin 16 is typically formed integrally with the film 14 but alternatively may be applied as a separate layer. Alternatively, a flat sheet membrane cast on a supporting layer may be used.

The support 12 may be made, for example, of braided filaments such as nylon or polyester. Optionally, a support 12 may be another form of textile support, for example a knitted or non-woven tube or fabric, or a loose microfiltration membrane. Voids in the support 12 are created between filaments or by pores in the support 12. These voids may have a size in the range of about 10 to 100 microns. Smaller voids would have increased resistance to filtration through the membrane. However, larger voids would allow the membrane film 14 to penetrate deeply into the voids and would also not provide as much filtering capacity in the event of loss of part of the film 14.

The membrane 10 may be made by casting a membrane forming dope onto the support 12 as the support passes through a coating nozzle. The dope and support 12 exit the nozzle and enter a coagulation bath to form the film 14 and, optionally, the skin 16. The film 14 is typically polymeric and may be made up, for example, mostly of polyvinylidene difluoride (PVDF). Suitable membranes are described in: U.S. Pat. Nos. 5,472,607, 6,354,444, 7,267,872 and 7,306,105; and, International Publication Number WO 2010/062454, which are incorporated by reference. Of these, the membranes described in U.S. Pat. No. 6,354,444 and International Publication Number WO 2010/062454, and ZeeWeed™ membranes sold by GE Water and Process Technologies, are preferred in an embodiment.

Figure 2:
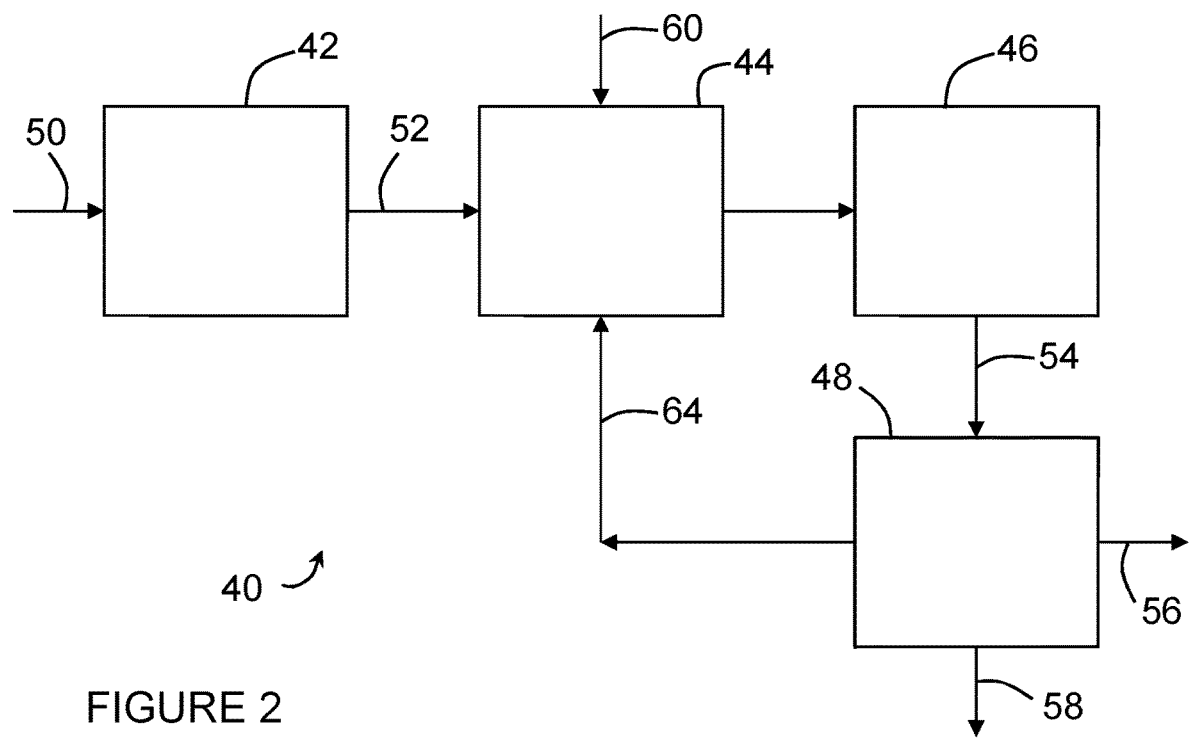
FIG. 2 is a process flow diagram of a membrane bioreactor (MBR).

FIG. 2 shows a membrane bioreactor (MBR) 40. The MBR 40 has a screen 42, an anoxic tank 44, an aerobic tank 46 and a membrane tank 48. Influent wastewater 50 passes through the screen 42 to remove trash, fibers, and other large items that might otherwise damage the membranes. Screen effluent 52 is treated biologically in the anoxic tank 44 and the aerobic tank 46. Mixed liquor 54 is sent from the aerobic tank 46 to the membrane tank 48. Immersed membranes in the membrane tank 48 remove filtered permeate 56 from the mixed liquor 54. A portion of the remaining concentrated mixed liquor leaves the MBR as waste activated sludge 58. Another portion of the remaining concentrate mixed liquor returns to the anoxic tank 44 as return activated sludge 64.

MBR 40 is merely one example of an MBR. The screen 42 is optional, though it is preferable in an embodiment to have a screen 42. In other MBRs, a screen 42 may be provided, for example, in or directly upstream of the membrane tank 48 or in a side stream loop. The anoxic tank 44 and aerobic tank 46 make up a biological process section of the MBR 40 and can be referred to collectively as process tanks. Other MBRs may have more or less process tanks or may combine multiple processes in a single tank. Optionally, the membrane tank 48 may be omitted and the membranes may be immersed directly in a process tank.

The influent wastewater 50 has an average flow rate designated as Q. The flows between the process tanks and the membrane tank 48, if any, make up a mixed liquor recirculation loop that has a flow rate of greater than Q. For example, the flow of return activated sludge 64 may be in the range of 3 to 5 times Q. Permeate 56 is withdrawn at a flow rate of about 80 to 99% of Q. The flow rates of the permeate 56 and waste activated sludge 58 are adjusted as required to provide a mass balance with the influent wastewater 50 and to maintain a desired solids (sludge) retention time (SRT). Depending on the configuration of the biological process section of an MBR, the return activated sludge 64 may be sent to a different process tank. There may also be additional recycle loops within the biological process section.

The membranes are typically provided in the form of modules or cassettes. A module or cassette contains many membranes held in a frame that can be lowered into the membrane tank 48 or one of the process tanks. The skins 16 of the membranes contact the activated sludge. Permeate 56 may be withdrawn by applying suction to the insides of the membranes. Bubbles, typically air bubbles, are provided to inhibit fouling of the membranes. Fouling is also inhibited by periodic backwashing, alternatively called backpulsing, or relaxation steps in between permeation steps. The bubbles may be provided intermittently or continuously, but are, in an embodiment, provided during at least part of the backwashing or relaxation steps. The bubbles are also, in an embodiment, provided during at least part of the permeation steps. In an embodiment, the membranes are ZeeWeed™ 500 series membranes sold by GE Water and Process Technologies.

Powdered activated carbon (PAC) 60 is added to the MBR 40. In the example of FIG. 2, the PAC 60 is added to one of the process tanks, particularly the anoxic tank 60. Alternatively, the PAC 60 may be added anywhere that the PAC 60 will contact mixed liquor. For example, the PAC 60 may be added to another process tank or to the membrane tank 48.

The particle size of PAC 60 is typically smaller than 0.297 mm (50-mesh sieve). Smaller particles provide more surface area for adsorption per unit volume. However, the particle size of the PAC 60 is, in an embodiment, at least 10 times the membrane pore size. Although PAC 60 is preferred in an embodiment, alternatively other adsorbents may be used.

PAC 60 is added to the mixed liquor to maintain a selected PAC concentration. The PAC 60 may be added in batches or continuously. With batch dosing, the timing of doses may be adjusted according to changes in operation of the MBR 40 or the timing of periodic removal of waste activated sludge 58. With continuous dosing, the dosage rate may be varied from time to time. The selected PAC concentration may be 200 mg/L or more, or 500 mg/L or more, or more than 600 mg/L, or 1000 mg/L or more. The PAC concentration may be 2,000 mg/L or less but, in some cases, concentrations of up to 5000 mg/L or more may be used. The PAC concentration is, in an embodiment, in the range of 500 mg/L to 2000 mg/L, or 1000 mg/L to 2000 mg/L. The PAC 60 travels in the recirculating flow. There is no solid-liquid separation device in the recirculation loop before the membranes, other than perhaps a screen with an opening size of 1 mm or more for removing trash and fibers, and so the PAC 60 contacts the skin 16 of the membranes 10.

The PAC 60 enhances contaminant removal in the MBR 40. Contaminants such as organic compounds in the process tanks are removed both by adsorption by the PAC 60 and biodegradation. This increases the removal rate of adsorbed contaminants and increases effluent quality. In particular, the removal of one or more of organic compounds, nitrogen and recalcitrant COD may improve with the addition of PAC 60. Dosing PAC to the MBR system can also increase the tolerance of the MBR to shock loads, toxic contaminants in the influent wastewater 50, fouling substances produced by bacteria in the mixed liquor, or upset conditions. In some cases, membrane fouling can be reduced. A biofilm usually forms on the surface of the PAC 60 which can result in an increased rate of biodegradation.

The reinforced membranes 10 accommodate abrasion effects of the PAC 60 in the MBR 40 better than unsupported membranes. In particular, since the support 12 strengthens the membranes, the film 14 is not required to withstand significant tensile forces. Accordingly, abrasion of the film 14 does not cause the membranes 10 to become mechanically unstable or fail by breaking. Further, the support 12 is capable of filtering some of the solids in activated sludge. Even if the film 14 is completely removed by abrasion in a particular part of the membranes, a cake layer builds up on the support 12. The cake layer becomes capable of filtering out smaller solids in the manner of a pre-coat filter. Accordingly, the membranes 10 have a reasonable life span despite being exposed to the PAC 60.

The PAC 60 or other carriers may be enhanced by immobilizing one or more bioaugmentation products on the carriers before they are added to the MBR 40. The bioaugmentation enhanced carriers may provide higher recalcitrant COD removal efficiency, better tolerance to various shock loading conditions or quicker biological process recovery. The bioaugmented carriers may also be used with other forms of MBRs or with conventional bioreactors.

Bioaugmentation products typically comprise a blend of microbial strains. Some bioaugmentation products also include enzymes. The microorganisms are in a vegetative state or in spores while the bioaugmentation product is stored but is activated when the product is used. Bioaugmentation products are normally used for seeding during bioreactor start up or for recovering biological systems during or after shock loading. Commercially available bioaugmentation products include BioPlus™ products from GE Water & Process Technologies, BioQuick™ products from Novozymes, and Microcat™ products from MBR Technologies. Bioaugmentation products to be used as described herein may be selected from commercially available products or prepared using one or more selected strains of microorganisms in a vegetative or active state.

Bioaugmentation products are usually dosed directly into process tanks without a carrier. The bioaugmentation products are diluted in the bulk mixed liquor and may be washed out through a secondary clarifier. In the MBR 40, however, one or more bioaugmentation products are immobilized on a carrier, such as PAC 60. The carrier is retained in the MBR 40 and so the bioaugmentation product is also retained in the MBR 40.

A bioaugmentation product is immobilized by growing a culture of the product in a dispersion of PAC 60 outside of the MBR. Optionally, the bioaugmentation product may be activated or some growth established before PAC is added. The culture is maintained until most of the bioaugmentation product is present in the form of biofilm attached to the PAC. For example, the culture may be maintained for 12 hours or more or 21 hours or more.

The bioaugmentation product immobilized on a carrier is retained in a bioreactor to increase the effect of the product on recalcitrant COD removal. When an MBR 40 is not used, larger carriers such as GAC may be used to retain the bioaugmented carriers in the bioreactor through a clarifier or a screen.

The bioaugmentation product, or one or more microbial strains that will be used to make a bioaugmentation product, are, in an embodiment, screened or selected to obtain products or strains that efficiently biodegrade or remove recalcitrant organic compounds in a target wastewater. For example, BioPlus™ BA2900 may be used. In an embodiment, the selected products or strains are then pre-immobilized on a carrier, in an embodiment, a carrier that can also adsorb the recalcitrant organic compounds in the wastewater, such as PAC 60. Then the carrier with the pre-immobilized bioaugmentation product is dosed into a bioreactor. This may enhance recalcitrant COD removal or tolerance of the reactor to shock loads, toxicity or various upset conditions often encountered in industrial wastewater treatment processes. In lab and pilot testing described in the examples below, refinery wastewater treatment processes demonstrated enhanced recalcitrant COD removal and rapid recovery from shock loading and process upset conditions.

Although the bioaugmentation products are in an embodiment pre-immobilized, in the case of an MBR 40 with PAC 60 addition or another reactor with carrier retention, adding a bioaugmentation product to the mixed liquor may also be partially effective. At least some of the microbes may form a biofilm on the carrier in the reactor and then be retained in the reactor. Without intending to be limited by theory, it appears that PAC that is present in a bioreactor and has adsorbed COD provides both a high surface area and available food source which allows microbes in a bioaugmentation product to rapidly form a biofilm on the PAC. This is particularly likely to occur when the bioaugmentation product is selected for its ability to consume recalcitrant COD in wastewater being treated in the MBR. The recalcitrant COD may be present to a greater extent, relative to more readily biodegraded COD, in the PAC than in the MBR generally.

The invention will now be further described with reference to the following examples which are to be regarded as illustrative and not as restricting the scope of the invention. Various experiments or tests were conducted using ZeeWeed™ 500D membrane modules. These modules have hollow fiber PVDF membranes supported on a tubular braid. The average pore size is in the range of 0.02 to 0.04 microns.

Example 1

Tests were done to determine the effect of complete removal of the membrane film in a portion of the membrane. A pilot scale MBR was operated continuously using municipal screened raw wastewater as the influent. Three ZW500D modules with a total surface are of about 1110 square feet were immersed in a membrane tank and operated under typical full scale design conditions. Indigenous *E. coli* and coliphage bacteria were present in the feedwater. The membranes were operated in repeated 12.5 minute cycles consisting of 12 minutes of permeation followed by 30 seconds of backwashing or relaxation.

The integrity of some of the membranes was compromised by using a knife to scrape away a portion of the film from the tubular support. An area about 10 mm high and about 3 mm in perimeter was removed from each fiber. After an initial period of operation with intact membranes, the membrane film was removed from 1, 10, 50 and 100 fibers in successive time periods. Fecal coliform concentrations were measured at various times in the feedwater and the permeate.

The MBR was first operated with cycles having a relaxation step. The feedwater had a fecal coliform concentration of about 10,000,000 CFU/100 mL. During an initial 75 minute operating period, fecal coliform concentration in the permeate was 3 CFU/100 mL. The same concentration was observed at the start and end of cycles with 1 fiber and 10 fibers compromised. With 50 fibers compromised, a rise in fecal coliforms to 16 CFU/100 mL was measured at the end of the first cycle. However, when measured after 24 hours, the fecal coliform concentration had returned to 3 CFU/100 mL. With 100 fibers compromised, the fecal coliform concentration initially rose to 20 CFU/100 mL but when measured after two hours the fecal coliform concentration had returned to 4 CFU/100 mL. With 100 fibers compromised and a change to cycles with a backwashing step, fecal coliform concentration after another 2 hour period of operation was 2 CFU/100 mL. These results indicate that the supported membranes were capable of removing fecal coliforms even with portions of the membrane film removed. Results were similar with cycles having backwashing or relaxation steps. Without intending to be limited by theory, it seems that a cake layer formed over the exposed portions of the tubular support that was sufficient to filter out fecal coliforms. Even if the membranes were severely abraded in use, their service life should not be limited by a failure to provide mechanically disinfected permeate.

Example 2

Tests were done to determine the effect of adding PAC to an MBR on COD removal. A lab scale MBR unit included a 3 L anoxic tank with a submersible mixer, a 6 L aerobic tank and a 3 L membrane tank. A submerged membrane module with nominal 0.04 μm pore ZeeWeed®500D membranes and a surface area of 0.03 m2 was immersed in the membrane tank and operated to attain an initial flux at 10 gfd. The reactor was seeded with activated sludge from a refinery wastewater treatment plant. The return activated sludge flow rate was four times the effluent flow rate. The MBR was fed with a synthetic refinery wastewater with the following concentrations of typical recalcitrant refinery compounds: 50 mg/l 2,4,6-Tricholorophenol (TCP), 50 mg/l methyl tertbutyl ether (MTBE), 50 mg/l isoquinoline, 50 mg/l indole, 30 mg/l 2-phenoxyethanol, 150 mg/l phenol and 80 mg/l emulsified oil. A wood based PAC was selected and used in the test.

After an acclimation period of two months, the MBR was operated in four phases. Phase 1 consisted of operation for about one month without PAC. In phase 2, the MBR was operated for four months with a PAC concentration of 0.5 g/l. In phase 3, the MBR was operated for one month with a PAC concentration of 1 g/l of PAC. In Phase 4, the MBR was operated for 5 weeks with a PAC concentration of 2.0 g/l. During these phases, the MBR was operated in a continuous feed and sludge wasting mode with a hydraulic retention time (HRT) of 24 hours. Sludge retention time (SRT) was set to maintain a mixed liquor suspended solids (MLSS) concentration of between 6 and 8 g/L. COD concentrations were regularly monitored following the COD testing method specified in ISO15705:2003-01.

FIG. 3 shows the COD concentrations in the influent and the effluent (permeate). In phase 1, without PAC, the average MBR effluent COD was about 140 mg/l while the average influent COD concentration was 1273 mg/l. In phase 2, the average effluent COD concentration decreased to 72 mg/l, or an additional 43% COD removal. In Phase 3 an additional 32% COD removal was achieved relative to phase 2 and the average MBR effluent COD was about 46 mg/l. No significant further COD removal was observed in phase 4. No significant perforation of the membrane skins was observed after 6 months of operation with PAC. Abnormally high COD was observed in the area circled in phase 3 due to a temporary aeration failure.

Example 3

In this example, experiments were conducted to investigate the efficacy of PAC on reducing the toxic effect of bio-inhibitory compounds on activated sludge microorganisms by measuring specific oxygen uptake rate (SOUR).

Two identical lab scale MBRs were run in parallel. Both reactors operated in batch mode with an HRT of 48 hours and no sludge discharge. Dissolved oxygen (DO) concentration was maintained around 3 mg/l in the reactors. Initial biomass concentration was about 3 g/L for both reactors. After sludge acclimatization, 2 g/L of PAC was dosed into one of the MBR reactors referred to as the PAC-MBR. Wastewater from a refinery with an influent COD concentration of 682 mg/l was fed to the reactors for one week. Then the feed COD concentration was increased to 1247 mg/l and tricholorophenol (TCP), a bio-inhibitory compound, was added to the wastewater for a second week. SOUR was measured by a HACH HQ10 Portable LDO Meter.

FIG. 4 shows the SOUR results for the PAC-MBR and the control MBR in two different phases. The presence of PAC demonstrated about 1.3 to 2.8 times higher SOUR compared to the control MBR without PAC. SOUR decreased over time in the reactor without PAC due to inhibition of activated sludge activity caused by introducing toxic TCP. However, the SOUR was higher even with the increase in feed TCP concentration in the PAC-MBR in the second week. The tests suggest that the PAC, possibly with attached biofilms on the PAC surface, enhanced the tolerance of the PAC-MBR to a toxicity and high COD shock loading.

Example 4

A study was conducted using powdered activated carbon (PAC) in an MBR to remove COD from refinery wastewater. Two separate wastewater streams were used, one with high COD wastewater and one with low COD wastewater. A full scale MBR using ZeeWeed®500D membrane modules was used to treat the low COD wastewater. A second pilot scale MBR configured as shown in FIG. 2 with PAC addition (PAC-MBR) also used ZeeWeed® 500D membrane modules. Fresh PAC was added to the PAC-MBR as required to make up for PAC loss due to sludge discharge. In both MBRs, the membrane net flux was maintained at 10 gfd, the HRT was 24 hours, and the SRT was between 45 and 50 days. The sludge was recirculated from membrane tank to anoxic tank at four times the permeate flow rate. Influent and effluent samples were collected and tested daily.

The low COD wastewater had a COD concentration in the range of 200-300 mg/l. The long term average effluent COD concentration for the full scale MBR was around 51 mg/l without PAC. In the PAC-MBR pilot, the average effluent concentration was 35 mg/l when fed with low COD wastewater and operated with a PAC concentration of 0.25 g/l. The high COD wastewater had an average COD concentration of 720 mg/l. When fed with the high COD wastewater, the pilot PAC-MBR had an average effluent concentration of about 30 mg/l when operated with a PAC concentration of 1.0 g/l.

During shock loading, the effluent COD concentrations of the pilot MBR with PAC concentration of 1.0 g/L were about 50% lower than those in the full-scale MBR where no PAC was added. In another test, fresh PAC was dosed to raise the PAC concentration in the pilot MBR from 1.0 g/l to 2.0 g/l to reduce the shock loading impact with high COD water. A significant COD drop in the PAC-MBR effluent from 108 mg/l to 42 mg/l was initially observed and was further reduced to around 30 mg/l after two days. The biological recovery from shock loading was apparently accelerated by dosing fresh PAC.

Example 5

In order to test the long term abrasion effect of PAC on membrane fibers, an accelerated abrasion study was conducted using ZeeWeed® 500D membrane modules. A pilot scale MBR was operated continuously using municipal screened raw wastewater as the influent. Norit® PAC Hydrodarco® C was added to an MBR containing the membrane modules to maintain an initial concentration of 5.0 g/L. Then PAC concentration was further increased to 7.0 g/L and 10 g/L during later parts of the test. Membrane bubble point tests and scanning electron microscope (SEM) images were used to evaluate the surface characteristics of the membranes. No material membrane abrasion was found after 18 months of study.

Example 6

Bioaugmentation microorganisms were immobilized on a PAC carrier. A synthetic wastewater simulating refinery wastewater was prepared containing: 20 mg/L of 2,4,6-trichlorophenol; 30 mg/L of methyl tertbutyl ether (MTBE); 30 mg/L of isoquinoline; 30 mg/L of indole; 20 mg/L of 2-phenoxyethanol; and, 60 mg/L of phenol. The total COD concentration in the synthetic wastewater was about 400 mg/L. The ratio of COD:N:P in the feed water was adjusted to 200:5:1 by dosing $NaH_2PO_4$ and $NH_4Cl$. A screened bioaugmentation product comprising *Bacillus, Comamonas* and *Rhodanobacter* was used in the study. Optical density (OD), at a wavelength of 600 nm, was monitored by a HACH DR5000 Spectrophotometer. The total bacteria count was analyzed by a 3M Petrifilm™ 6406 Count Plate following the SN/T 1897-2007 standard method.

100 ml of the synthetic refinery wastewater and 0.10 g of Oxoid Tryptone Soya Broth were mixed in a 500 mL Erlenmeyer flask. 0.75 g of the bioaugmentation product was used for microbial inoculum. The process was operated in a batch mode. The flask was agitated at 130 rpm in a 28° C. water bath to activate the microorganisms. The OD growth curve was monitored over time. 0.25 g of fresh PAC was dosed into the flask as a bacteria immobilization carrier in the late exponential growth phase and the corresponding total aerobic bacteria count was measured.

In order to assess the time required to form a stable biofilm on the PAC, 10 mL samples were taken from the flask to measure the free bacteria count and immobilized bacteria count over time. A supernatant was centrifuged at 2000 rpm for 8 minutes and analyzed for the free bacteria count. Remaining PAC was sampled and sonicated for 25 minutes. Then a sonication supernatant was also centrifuged at 2000 rpm for 8 minutes and analyzed for the immobilized bacteria count. The percentages of immobilized bacteria in the total bacteria were 41.0%, 96.8% and 98.9% at 8 hrs, 21 hrs and 45 hrs respectively. Almost all of the bacteria were immobilized on the PAC within 21 hours. SEM analysis further confirmed a dense and uniformly distributed biofilm on the PAC surface.

Example 7

The performance of an MBR with a bioaugmentation product pre-immobilized on PAC was compared to an MBR with ordinary PAC. Three 3 liter bench-scale MBRs were operated in parallel including: a control MBR (R1) without PAC, a PAC-MBR with ordinary PAC (R2), and a PAC-MBR with bioaugmentation microorganisms pre-immobilized on the PAC as described in Example 6 (R3). The PAC concentration in reactors R2 and R3 was maintained at 0.5 g/L. The MBRs were seeded with sludge from a refinery plant and acclimated for about one month before the study. HRT in the MBRs was about 24 hrs and SRT was about 100 days. A synthetic refinery wastewater similar to that in example 6 was fed to all three MBRs.

The reactors were operated under stable conditions for 36 days. COD concentrations in the effluent were regularly monitored following the COD testing method specified in ISO15705:2003-01. As shown in FIG. 5, the average COD concentrations of the effluents in the three reactors were 46.9 mg/L for R1, 20.3 mg/L for R2, and 11.5 mg/L for R3. The average feed COD concentration during this time was 704 mg/L. The results indicated that the PAC with pre-immobilized bioaugmentation product enhanced the removal of COD. It is likely that the enhancement included an increase in the removal of recalcitrant COD in R3.

A shock loading was applied from day 17 to day 27 by increasing the feed COD concentration to 930 mg/L. The effluent COD concentrations increased immediately and the effluent COD concentrations of all the three MBRs was over 200 mg/L during the shock loading time period. Once the feed COD concentration was returned to about 700 mg/L, the pre-immobilized bioaugmentation product PAC-MBR (R3) showed the quickest recovery from the upset to a normal COD concentration in the effluent.

Example 8

Pilot scale studies were conducted to evaluate the performance of a bioaugmentation product on restoring overly aged mixed liquor in an MBR with powdered activated carbon (PAC). The MBR included a 10 $m^3$ anoxic tank with a submersible mixer. A centrifugal pump transferred mixed liquor from the anoxic tank to a 30 $m^3$ aerobic tank. The aerobic tank was equipped with a fine bubble diffuser at the bottom of tank to deliver air to the aerobic tank. Three Zeeweed®500D membrane modules were immersed in a 900 L membrane tank with aeration to reduce membrane fouling. Return activated sludge was pumped from the membrane tank back to the anoxic tank at four times the feed water flow rate (4Q) by a centrifugal pump. The feedwater to the MBR was refinery wastewater. A wood based PAC was selected and dosed in the process tanks to maintain the PAC concentration at 3.0 g/L.

500 g of a bioaugmentation product (BioPlus™ BA2900, sold by GE Water and Process Technologies) was mixed with 5 liters of refinery wastewater. The solution was aerated for 4-6 hours and then dosed directly into both the anoxic tank and the aerobic tank.

Prior to dosing the bioaugmentation solution, biological activity in the PAC-MBR was decreased by stopping the discharge of waste activated sludge for a long time to age the mixed liquor. The average effluent COD concentration increased to 62 mg/L. Within two days of adding the bioaugmentation product into the PAC-MBR, the performance of the PAC-MBR had recovered to an average effluent COD of 35 mg/L. Sludge wasting was re-started to provide an SRT of 45-50 days and the MBR maintained similar COD removal performance.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A refinery wastewater treatment process, comprising the steps of:
    feeding influent refinery wastewater at a feed flow rate through a biological process section of a membrane bioreactor to form a mixed liquor, wherein the influent refinery wastewater has a chemical oxygen demand (COD) concentration of at least 200 mg/L and comprises 2,4,6-trichlorophenol (TCP), methyl tertbutyl ether (MTBE), isoquinoline, indole, 2-phenoxyethanol, phenol, and emulsified oil;
    flowing the mixed liquor to a membrane tank of the membrane bioreactor, the membrane tank containing membranes comprising a film on a supporting structure to produce a concentrated mixed liquor;

recirculating a portion of the concentrated mixed liquor to the biological process section at a flow rate that is at least 200% of the feed flow rate; and, maintaining a concentration of sorbent particles in the range of 200 mg/L to 5000 mg/L in the mixed liquor, wherein the sorbent particles contact the membranes.

2. The process of claim 1, wherein the sorbent particles comprise powdered activated carbon.

3. The process of claim 1, wherein the membranes are hollow fiber membranes comprising a tubular braid support.

4. The process of claim 1, wherein the membranes are immersed suction driven membranes.

5. The process of claim 1, wherein the membranes are scoured with air bubbles at least during a part of a permeation period.

6. The process of claim 1, wherein the membranes have an average pore size of 0.05 microns or less.

7. The process of claim 1, further comprising:

adding one or more bioaugmentation products to the membrane bioreactor.

8. The process of claim 7, wherein the one or more bioaugmentation products are immobilized on a carrier and the carrier is powdered activated carbon.

9. The process of claim 7, wherein the one or more bioaugmentation products are screened for their ability to enhance removal of recalcitrant chemical oxygen demand.

10. The process of claim 7, wherein the one or more bioaugmentation products are immobilized on a carrier before the one or more bioaugmentation products are added to the membrane bioreactor.

11. The process of claim 10, wherein the one or more bioaugmentation products are immobilized by growing a culture of the one or more bioaugmentation products in a dispersion of the carrier.

12. The process of claim 11, wherein the culture is maintained until most of the one or more bioaugmentation products are present as a biofilm on the carrier.

13. The process of claim 1 wherein the supporting structure has voids having sizes in the range of 10 to 100 microns.

14. The process of claim 3, further comprising allowing a cake layer to build up on the support.

15. The process of claim 3, wherein the process includes maintaining the concentration of sorbent particles in the range from (a) 500 mg/L to (b) 5000 mg/L in the mixed liquor.

* * * * *